3,350,395
4,4' - BIS[(4-N-2-SULFOETHYLAMINO) - 6 - SULFO-
PHENOXY - S - TRIAZIN-2-YLAMINO]-2,2' - STIL-
BENEDISULFONIC ACID BRIGHTENERS
Albert F. Strobel, Delmar, and Sigmund C. Catino,
Castleton, N.Y., assignors to General Aniline &
Film Corporation, New York, N.Y., a corporation
of Delaware
No Drawing. Filed Oct. 21, 1966, Ser. No. 588,325
3 Claims. (Cl. 260—240)

ABSTRACT OF THE DISCLOSURE

A new class of brightener compounds of the stilbene-cyanuric type having a total number of eight sulfonic acid groups and having solubility in acidic medium of a pH of about 1 are obtained by first condensing one mole of 4,4'-diaminostilbene disulfonic acid with approximately 2 moles of cyanuric chloride and condensing the resulting product with 2 moles of a phenoldisulfonic acid and then with 2 moles of either taurine, N-methyltaurine or N-ethyltaurine.

This application is a continuation-in-part of our application Ser. No. 272,534, filed on April 12, 1963, now abandoned.

This invention relates to a novel class of brightener compounds of the stilbene-cyanuric type having solubility in acidic medium of a pH of about 1.

The art is replete with various brighteners of the stilbene-cyanuric acid chloride type. Such brighteners, however, are not soluble in acid medium at a pH of about 1, i.e., they readily precipitate in dilute mineral acid medium, and as a consequence cannot be employed as brightening agents with cationic finishing agents on cellulosic media.

Accordingly, the principal object of the present invention is to provide a new class of brightener compounds of the stilbene-cyanuric type having solubility in acidic medium, i.e., acid soluble at a pH of about 1, and particularly adaptable for use as brightening agents with cationic surface active agents (cationic synthetic detergents) on cellulosic media, with alum and rosin size in paper making, with casein-clay coatings on paper, and other uses on cellulosic materials yielding brighter hues.

Other objects and advantages will appear hereinafter.

The above objects are accomplished by utilizing a brightening agent characterized by a structure corresponding to the following general formula:

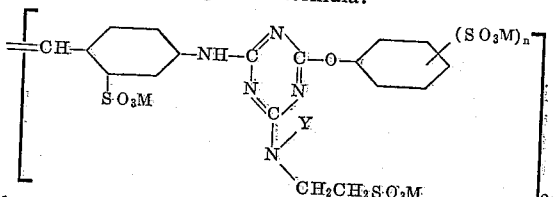

wherein M represents either hydrogen or an alkali metal, i.e., lithium, sodium or potassium, n represents a positive integer of from 1 to 2, and X and Y each represent either hydrogen, a methyl or ethyl group.

The brighteners characterized by the foregoing general formula are prepared by condensing, in the conventional manner, approximately one mole of 4,4'-diaminostilbene disulfonic acid with approximately 2 moles of cyanuric chloride and this product in turn condensed with 2 moles of a phenolsulfonic acid (either a mono- or di-sulfonic acid) and then with 2 moles of either taurine, N-methyl taurine or N-ethyltaurine. If desired, an excess of up to about 10% of any of the reactants may be employed. While this order of condensation is preferred, it can be varied. For example, the cyanuric chloride can be condensed with the phenolsulfonic acid, then with taurine, N-methyltaurine or N-ethyltaurine and finally with 4,4'- diaminostilbenedisulfonic acid.

The phenolsulfonic acids which may be employed have the formula:

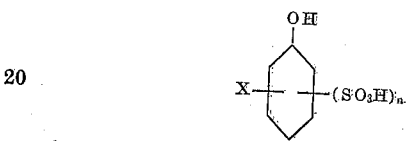

wherein n and X have the same values as above and are exemplified by o-phenolsulfonic acid
m-phenolsulfonic acid
p-phenolsulfonic acid
6-methyl-phenol-3-sulfonic acid
6-methyl-phenol-4-sulfonic acid
phenol-2,4-disulfonic acid
phenol-2,5-disulfonic acid
phenol-3,5-disulfonic acid
4-methyl-phenol-2,6-disulfonic acid The following examples will illustrate the invention, but are not intended to be limitative thereto. Unless otherwise specified, the parts are by weight.

EXAMPLE I

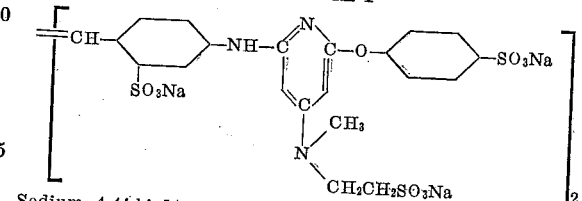

Sodium 4,4'-bis[4-(N - methyl-N-2-sulfoethylamino)-6-p-sulfo-phenoxy-s-triazin-2-ylamino]-2,2'-stilbenedisulfonate 15 grams of cyanuric chloride were dissolved in 65 cc. of acetone at 30° C. This was downed under agitation in a slush of 100 grams of ice chips and 20 cc. of water. At a temperature of —8° to 2° C. there were gradually added 148 cc. of a 10% by weight per volume of an aqueous solution of 4,4'-diamino-2,2'-stilbenedisulfonic acid (0.04 mole) while maintaining the pH neutral (Congo delta) with 25 ml. of 20% aqueous soda ash solution. The mixture was stirred for 1 hour at about 0° C. to a negative amine test. There were then added 18.8 grams of sodium p-phenolsulfonate. 2H$_2$O (0.08 mole). The material was stirred 5 hours at 35° C., keeping the pH faintly phenolphthalein alkaline by addition of 16 cc. of 20% by weight per volume of an aqueous caustic soda solution. There were then added 38.6 grams of 31.7% aqueous methyltaurine solution (0.088 mole). The material was stirred 3 hours at 65° C., then 6 hours at 95° C., the pH being maintained strongly phenolphthalein alkaline by the addition of 16 mls. of 20% aqueous caustic soda solution. It was finally treated with Nuchar (activated carbon), filtered and evaporated to dryness.

*Application of brightener compound to cotton*

A piece of cotton cloth weighting approximately 100 grams was padded in the usual fashion with an aqueous suspension containing 1.43 grams of a cationic synthetic softening agent (commercially available under the brand-name of Soramine CS) and 0.07 gram of the above brightener compound dissolved in 100 ml. of water. The padded cotton cloth was then squeezed out on rubber rollers and dried. This represents 1% detergent-.05% brightener dyeings. The treated cotton cloth has a very much brighter hue than a similar piece of cotton padded with an aqueous solution containing only 1.43 grams of the cationic synthetic softening agent.

*Application of brightener compound in coating of alum sized bond paper*

A 0.6 gram portion of the purified brightener compound was dissolved in 1 liter of water at room temperature. The pH was adjusted to 1 with sulfuric acid. Alum sized bond paper was dipped in the solution and dried. As a blank control, the same alum sized bond paper was dipped into an aqueous sulfuric acid solution having a pH of 1, then dried. The blank control, without brightener compound, and the alum sized bond paper coated with the brightener compound were subjected to the brightness test. The comparative brightness readings at the peak were:

Blank control ------------------------------------ 1
Brightener compound ---------------------------- 32

Coatings on the same alum sized bond paper with an aqueous solution of the same concentration and pH were made with the following brightener compounds and comparative brightness readings determined:

Brightness reading at the peak

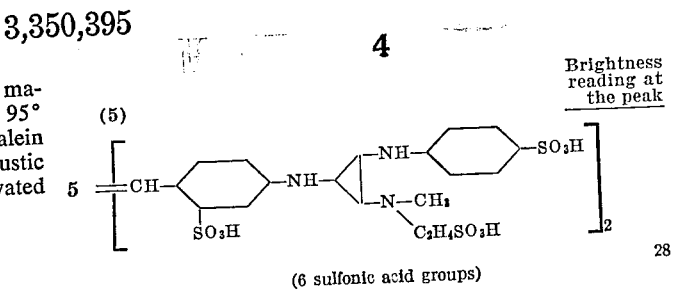

(1) (2 sulfonic acid groups)   7
(2) (4 sulfonic acid groups)   22
(3) (2 sulfonic acid groups)   11.5
(4) (4 sulfonic acid groups)   24

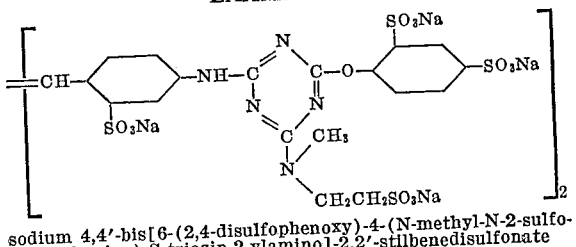

(5) (6 sulfonic acid groups)   28

From the foregoing results, it was surprising and unexpected that the brightness of the brightener compound of Example 1 increases substantially as the total number of sulfonic acid groups in such brightener compounds increases from 4 to 6, especially when the sulfoanilino in the triazin moieties are replaced by sulfophenoxy.

EXAMPLE II

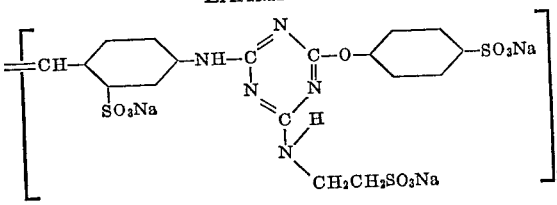

sodium 4,4'-bis[6-(2,4-disulfophenoxy)-4-(N-methyl-N-2-sulfo-ethylamino)-S-triazin-2-ylamino]-2,2'-stilbenedisulfonate Example I was repeated with the exception that 0.08 mole of sodium-p-phenolsulfonate was replaced by 23.8 grams (0.08 mole) of di-sodium phenol-2,4-dissulfonate.

The purified brightener compound, containing a total of 8 sulfonic acid groups, when coated on alum sized bond paper at the same concentration and pH as in Example I, gave a brightness reading at the peak of 38.

EXAMPLE III

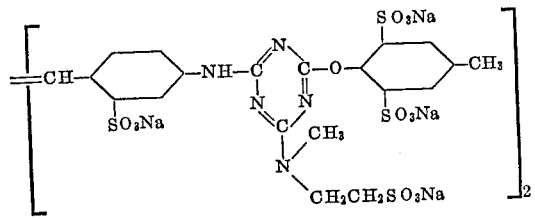

Example I was repeated with the exception that methyl taurine was replaced by 11 grams (0.088 mole) of taurine, giving a product having properties similar to that of the brightener of Example I in all application tests.

EXAMPLE IV

Example II was repeated with the exception that the di-sodium phenol-2,4-disulfonate was replaced by 25 grams (0.08 mole) of the di-sodium salt of 4-methyl-phenol-2,6-disulfonic acid, giving a product having properties similar to that of the brightener compounds of Example II in the application to alum sized bond paper.

From the foregoing illustrative examples it becomes clearly manifest that the brightener compounds of the present invention having from 6 to 8 sulfonic acid groups, are far superior to any previously known compounds containing from 2 to as high as 4 sulfonic acid groups when applied in a strong acid medium, i.e., at a pH of about 1.

We claim:
1. A brightener compound having the following formula:

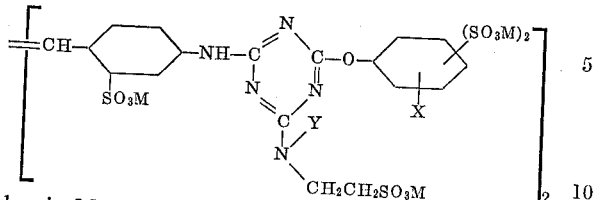

wherein M represents a member selected from the class consisting of hydrogen and an alkali metal, and X and Y represent a member selected from the class consisting of hydrogen, methyl and ethyl groups.

2. A brightener compound having the following formula:

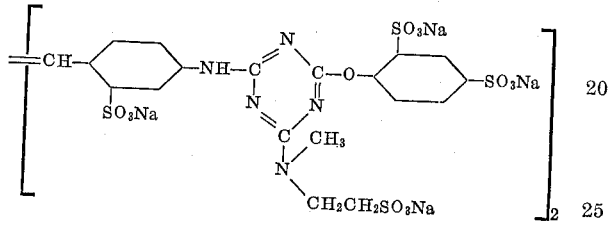

3. A brightener compound having the following formula:

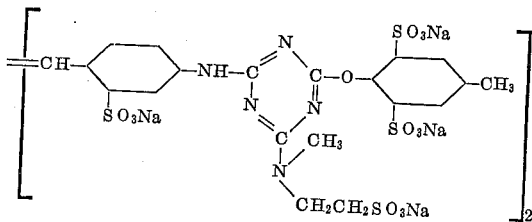

References Cited

UNITED STATES PATENTS

| 2,846,397 | 8/1958 | Ackermann | 260—240 XR |
| 2,945,762 | 7/1960 | Carroll et al. | 260—240 XR |

FOREIGN PATENTS

| 841,189 | 7/1960 | Great Britain. |
| 43,527 | 9/1960 | Poland. |

JOHN D. RANDOLPH, *Primary Examiner.*